US010196486B2

(12) United States Patent
Miyahara et al.

(10) Patent No.: US 10,196,486 B2
(45) Date of Patent: Feb. 5, 2019

(54) POLYARYLENE SULFIDE PRODUCTION METHOD AND POLYARYLENE SULFIDE PRODUCED USING PRODUCTION METHOD

(71) Applicant: Kureha Corporation, Tokyo (JP)

(72) Inventors: Michihisa Miyahara, Tokyo (JP); Hirohito Kawama, Tokyo (JP); Koichi Suzuki, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 15/327,472

(22) PCT Filed: Aug. 3, 2015

(86) PCT No.: PCT/JP2015/071971
§ 371 (c)(1),
(2) Date: Jan. 19, 2017

(87) PCT Pub. No.: WO2016/021557
PCT Pub. Date: Feb. 11, 2016

(65) Prior Publication Data

US 2017/0158820 A1 Jun. 8, 2017

(30) Foreign Application Priority Data

Aug. 6, 2014 (JP) ................................. 2014-160389

(51) Int. Cl.
*C08G 75/02* (2016.01)
*C08G 75/0204* (2016.01)
(Continued)

(52) U.S. Cl.
CPC ......... *C08G 75/0254* (2013.01); *C08G 75/02* (2013.01); *C08G 75/0204* (2013.01)

(58) Field of Classification Search
CPC ........................... C08G 75/14; C08G 75/0263; C08G 75/0268; C08G 75/0259; C08G 75/025; B30B 9/28
See application file for complete search history.

(56) References Cited

U.S. PATENT DOCUMENTS 5,905,137 A 5/1999 Haubs et al.
6,201,098 B1 3/2001 Haubs et al.
(Continued)

FOREIGN PATENT DOCUMENTS

JP S6153325 A 3/1986
JP S61136523 A 6/1986
(Continued)

OTHER PUBLICATIONS

International Search Report of PCT/JP2015/071971 dated Oct. 27, 2015.

(Continued)

*Primary Examiner* — Shane Fang
(74) *Attorney, Agent, or Firm* — Birch, Stewart, Kolasch & Birch, LLP

(57) ABSTRACT

The present invention is a production method for producing polyarylene sulfide, wherein an unreacted dihalo aromatic compound is recovered and reused. The present production method includes: (a) a polymerization step; (b) a separation step; and (c) a recovery step of recovering unreacted dihalo aromatic compound from a water-containing mixture of the separated liquid by steam distillation entailing adjusting the reflux ratio of water in the steam distillation column without adding water other than the refluxed water. Alternatively, the production method includes: (a) a polymerization step; (d) a dehydration step; and (c) a recovery step of recovering unreacted dihalo aromatic compound from a water-containing mixture of a water-containing liquid mixture and/or a water-containing steam mixture containing a raw material mixture and/or a polymerization reaction solution by steam
(Continued)

distillation entailing adjusting the reflux ratio of water in the steam distillation column without adding water other than the refluxed water in the dehydration step.

6 Claims, 1 Drawing Sheet

(51) Int. Cl.
*C08G 75/0254* (2016.01)
*C08G 75/14* (2006.01)

(56) References Cited

U.S. PATENT DOCUMENTS

| | | | |
|---|---|---|---|
| 2011/0178268 | A1 | 7/2011 | Suzuki et al. |
| 2013/0065054 | A1 | 3/2013 | Ichinose et al. |

FOREIGN PATENT DOCUMENTS

| | | | | |
|---|---|---|---|---|
| JP | H107798 A | 1/1998 | | |
| JP | H10158399 A | 6/1998 | | |
| JP | 2001503085 A | 3/2001 | | |
| JP | 2001504154 A | 3/2001 | | |
| JP | 2008266181 A | 11/2008 | | |
| JP | 2008-266181 | * | 7/2010 | ............. C08G 75/04 |
| JP | 2010144085 A | 7/2010 | | |
| JP | 2011148870 A | 8/2011 | | |
| WO | 2010013545 A1 | 2/2010 | | |
| WO | 2011145428 A1 | 11/2011 | | |

OTHER PUBLICATIONS

Notification of Reasons for Refusal issued in corresponding JP Application No. 2016-540223 dated Jan. 16, 2018, with English translation.

* cited by examiner

POLYARYLENE SULFIDE PRODUCTION METHOD AND POLYARYLENE SULFIDE PRODUCED USING PRODUCTION METHOD

TECHNICAL FIELD

The present invention relates to a method for producing polyarylene sulfide including: a polymerization step of producing a polymerization reaction solution containing polyarylene sulfide by performing a polymerization reaction on at least one type of sulfur source selected from the group consisting of alkali metal sulfides and alkali metal hydrosulfides and a dihalo aromatic compound in an organic amide solvent; and a separation step of separating the polymerization reaction solution into polyarylene sulfide and a separated liquid by solid-liquid separation; wherein an unreacted dihalo aromatic compound is recovered and reused.

In addition, the present invention relates to a method for producing polyarylene sulfide, the method including a dehydration step of performing dehydration (from a raw material mixture and/or polymerization reaction solution) during the polymerization reaction described above, wherein an unreacted dihalo aromatic compound is recovered and reused.

BACKGROUND ART

Polyarylene sulfide (hereinafter sometimes referred to as "PAS"), typified by polyphenylene sulfide (hereinafter sometimes referred to as "PPS") is an engineering plastic with excellent heat resistance, chemical resistance, flame retardancy, mechanical strength, electrical characteristics, dimensional stability and other properties, and is widely used as a material for resin parts in a wide range of fields such as electrical/electronic equipment, automobile equipment, and chemical equipment.

A known representative example of a PAS production method includes a method of performing a polymerization reaction on a sulfur source and a dihalo aromatic compound (also abbreviated as "DHA" hereafter) such as p-dichlorobenzene (also abbreviated as "pDCB" hereafter) in an organic amide solvent such as N-methyl-2-pyrrolidone (also abbreviated as "NMP" hereafter).

In recent years, demands for quality and demands from the market for reductions in production cost have spurred research into cost reduction by means of the recovery and reuse of raw materials used in the production of PAS—that is, the recovery and reuse of (i) an organic amide solvent and (ii) an organic solvent used to wash the PAS or to recover the organic amide as desired.

However, the recovery and reuse of unreacted DHA (in particular, pDCB) discharged in the dehydration step during the polymerization reaction and/or remaining in the polymerization reaction solution after the polymerization reaction have not been performed sufficiently.

The present inventors analyzed the reasons thereof and hypothesized that there are the following four causes.

The first cause is related to cost effectiveness. The conversion ratio of DHA in the production of PAS ordinarily exceeds 90%, so the amount of unreacted DHA remaining in the polymerization reaction solution after the polymerization reaction is too small to be recovered and reused. Therefore, if the cost of recovering a small amount of unreacted DHA (for example, the thermal energy cost for distillation or the operational cost) is too high, the cost effectiveness becomes low.

The second cause is the quality or the effect thereof on production when recovered unreacted DHA is reused to produce PAS (also simply abbreviated as "stable PAS production" hereafter). That is, in order to accommodate demands for quality from the market, a wide variety of manufactured goods must be produced. As a result, the starting raw materials, the polymerization reaction conditions, and the like become diverse, and unreacted DHA that is recovered in the recovery/reuse step differs in terms of the types or amounts of impurities that are produced. Therefore, it is natural to assume that the quality of unreacted DHA caused by these impurities or the effects thereof on the PAS production method will differ.

The third cause is related to highly efficient operability in the recovery step. That is, in recovery in the unreacted DHA recovery step during the polymerization reaction for each production formula or in accordance with the types or amounts of impurities after the polymerization reaction, it is considered to be necessary, of course, to control the continuing/stopping of the operation of the recovery device as well as the operation conditions in accordance with the types or amounts of impurities.

Accordingly, even if recovery technology were developed to allow processing, it is difficult to assess whether continuous operability would be stably achieved with the high efficiency required for cost reduction.

The fourth cause is that when taking into consideration the low cost effectiveness described above, it is possible to overcome environmental problems at relatively low cost by disposing unreacted DHA (for example, incineration) as a crude recovered product obtained when recovering a discharge liquid or discharge steam in a dehydration step during the polymerization reaction, a separated liquid in a separation step, a washing discharge liquid in a PAS washing step, an organic solvent used to recover an organic amide solvent, and the like rather than recovering and/or reusing unreacted DHA.

Japanese Unexamined Patent Application Publication No. S61-53325A (Patent Document 1) proposes a method for recovering, distilling, and purifying a solvent from a PAS reaction solution slurry, the method including supplying a PAS reaction solution slurry into a stirring tank of a rectification column having a stirring tank with a vertical jacket as a distillation still, heating the slurry while stirring, and fractionating the evaporating components with the rectification column. It is described that in the initial stage of recovery, water and then a small amount of an unreacted aromatic halide are first fractionated in terms of the order of boiling points, and the rest involves the recovery of polar solvents, which constitutes most of the content. However, Patent Document 1 describes that total reflux is first carried out in the rectification column and is then additional reflux is carried out after the temperature inside the column stabilizes, that the first distillation is received with a receptacle, and that after the completion of water distillation, the pressure inside the column is reduced to obtain a pDCB/NMP solution, so the method is not a method of recovering pDCB with high purity.

Japanese Unexamined Patent Application Publication No. 2008-266181A (Patent Document 2) proposes a PAS production method in which a recovered solvent containing at least water, pDCB, NMP, and NaCl following the recovery of PAS from a PAS polymerization solution is extracted with n-hexanol, and pDCB is then recovered from a water-containing mixture containing at least water, n-hexanol, pDCB, and NMP and used as a raw material for PAS. However, in this method, a step of separating and purifying a mixture containing the four components of NMP, n-hexanol, pDCB, and water obtained as an extracted and recovered product becomes necessary. Therefore, the equipment cost for constructing a distillation device becomes high, whereas the purity of the pDCB that is separated and purified is only 99.6%, which is not satisfactory industrially.

Japanese Unexamined Patent Application Publication No. 2010-144085A (Patent Document 3) proposes a method of recovering unreacted pDCB by means of azeotropy with water from an NMP solution following the separation and recovery of PAS from a polymerization reaction solution. However, in this method, it is absolutely necessary to adjust the water content by adding water to the NMP solution following the separation and recovery of PAS prior to the azeotropy operation. In addition, when unreacted pDCB that is recovered is reused, it cannot be considered sufficiently clear whether the four problems described above will be resolved—in particular, whether PAS can be stably produced.

Japanese Unexamined Patent Application Publication No. H10-007798A (Patent Document 4) proposes a method of returning a distilled polyhalo-aromatic compound to a rectification column as a reflux in order to dramatically reduce the amount of the polyhalo-aromatic compound distilled to the outside of the reaction system in a dehydration step during the polymerization reaction. However, with this method, it is not possible to completely eliminate the discharge of the polyhalo-aromatic compound, and impurities in the polyhalo-aromatic compound returned as a reflux cannot be considered to be sufficiently controlled.

Japanese Unexamined Patent Application Publication No. H10-158399A (Patent Document 5) proposes a method of using a rectification column with an intercooler in order to prevent a polyhalo-aromatic compound from being distilled to the outside of the reaction system in a dehydration step during the polymerization reaction. However, with this method, a rectification column with a complex structure becomes necessary, so the equipment cost becomes high, and the thermal energy cost cannot be considered satisfactory due to the use of the intercooler.

The present inventors searched for a simple method for recovering and reusing unused DHA so as to enable the stable production of PAS.

CITATION LIST

Patent Literature

Patent Document 1: Japanese Unexamined Patent Application Publication No. S61-53325A Patent Document 2: Japanese Unexamined Patent Application Publication No. 2008-266181A Patent Document 3: Japanese Unexamined Patent Application Publication No. 2010-144085A Patent Document 4: Japanese Unexamined Patent Application Publication No. H10-007798A Patent Document 5: Japanese Unexamined Patent Application Publication No. H10-158399A

SUMMARY OF INVENTION

Technical Problem

The present inventors pursued a production method that solves the aforementioned problems obstructing the recovery and reuse of unreacted DHA—specifically, first, the problem of cost effectiveness; second, the problem of stable PAS production; and third, the problem of highly efficient operability.

A discharge liquid or discharge steam obtained in a dehydration step during a polymerization reaction contains an organic amide solution, impurities, unreacted sulfur, water, and unreacted DHA. In addition, a separated liquid obtained by a separation step after the polymerization reaction contains microparticles or the like that cannot be separated from the produced PAS in addition to an organic amide solvent, by-product alkali metal salts, low polymers, impurities, an unreacted sulfur source, water, and unreacted DHA. Accordingly, the discharge liquid obtained in the dehydration step during the polymerization reaction or a liquid mixture containing a separated liquid can be considered a water-containing liquid mixture. In addition, the discharge steam obtained in the dehydration step during the polymerization reaction can be considered a water-containing steam mixture. Note that in this specification, a water-containing liquid mixture and water-containing steam may be generally called a “water-containing mixture”. Furthermore, when a washing discharge liquid or the like in a washing step is mixed with a separated liquid to recover unreacted DHA, the water-containing liquid mixture also contains water, an organic solvent, or the like used in the washing step.

The present inventors investigated the recovery of unreacted DHA from such a water-containing mixed solution or water-containing steam mixture containing various components so as to solve the problems described above.

In particular, the second problem, which is the recovery of unreacted DHA which enables the stable production of PAS even when unreacted DHA is reused—in other words, the recovery of unreacted DHA in which impurities that would inhibit the stable production of PAS are reliably reduced—is most critical. This means that in the recovery step, it is necessary for there to be no further production of impurities or the like.

Furthermore, the third problem that the recovery of unreacted DHA in the recovery step must be achieved with high efficiency and good operability, is also important, and this makes it possible to also anticipate a reduction in recovery cost. This leads to cost effectiveness, which is the first problem.

The present inventors conceived that although distillation is suitable as a recovery step for separating each component from a water-containing liquid mixture or water-containing steam mixture, steam distillation, which can be performed at a lower temperature than distillation, is appropriate for recovering unreacted DHA from the perspective of avoiding the new production of impurities or the like due to unforeseen thermal decomposition or the like caused by the distillation of each component in the target water-containing liquid mixture or water-containing steam mixture.

That is, the present inventors conceived that in order to recover unreacted DHA, it is necessary to efficiently separate an organic amide solvent, water, and unreacted DHA by means of steam distillation.

Furthermore, taking into consideration the PAS polymerization mechanism, impurities produced by the polymerization reaction may contain, for example, hydrophilic impurities such as sulfur-containing compounds and oxygen-containing compounds originating from the sulfur source serving as a reaction component. The present inventors conceived that these hydrophilic impurities may be solubilized in water.

In steam distillation, the following typically assumed: "the operation of blowing steam into a still and separating non-volatile matter as an impurity residue from water-containing liquid mixture with a high boiling point, which is insoluble in water and tends to be subjected to thermal decomposition, is called steam distillation, and steam contributes as both a heat source and a means for reducing the partial pressure of the entire system" (Society of Chemical Engineers (Ed.), "Chemical Engineering Handbook, 5th Revised Edition", Maruzen Co., Ltd., middle paragraph of the left column on page 466 (published Mar. 18, 1988)). Note that in the present invention, steam distillation refers to distillation performed by adjusting the reflux ratio of water in the steam distillation column without adding water other than the refluxed water using a water-containing liquid mixture containing a separated liquid or the like separated by solid-liquid separation from a polymerization reaction solution following a polymerization step, and this also includes heating the column base to generate steam from water present inside the steam distillation column. In addition, in the present invention, steam distillation refers to distillation performed by adjusting the reflux ratio of water in the steam distillation column without adding water other than the refluxed water using a water-containing liquid mixture or water-containing steam mixture containing a discharge liquid or discharge steam obtained in a dehydration step during the polymerization reaction, and this also includes generating steam from water present inside the steam distillation column by means of heating.

The present inventors investigated whether this steam distillation would make it possible to stably separate an organic amide solvent and water (containing unreacted DHA and impurities) so as to recover an organic amide solvent and would yield precise separation and recovery of unreacted DHA with reduced impurities from water. If this were possible, the impurities contained in unreacted DHA would be effectively reduced, and the running cost or thermal energy cost for separation would also be reduced.

However, as described above, even when an organic amide solvent and water (containing unreacted DHA) are separated from a water-containing liquid mixture or water-containing steam mixture containing a polymerization reaction solution, a separated liquid, a washing discharge liquid, or the like with a different production formula, there are many problems that need to be resolved such as whether highly efficient operability can be achieved without needing to stop operations or to adjust the operating conditions, or whether unreacted DHA which has no effect on the production of PAS can be recovered when unreacted DHA that is recovered is reused.

That is, in order to reliably recover unreacted DHA by steam distillation, there are many problems that must be investigated, such as: (i) the fact that the steam distillation column is controlled continuously; (ii) the fact that it may be necessary to frequently control the temperature inside the distillation column or, in some cases, to stop operation in order to achieve this control, and therefore highly efficient operability may be difficult to achieve; and (iii) whether the types or amounts of impurities or the like contained in unreacted DHA obtained from the fraction at the top of the steam distillation column (also abbreviated as the "distillate") vary over a wide range for each production formula.

When pDCB is used as DHA, NMP is used as an organic amide solvent, and water is used as a phase separation agent or for washing in the production of PAS, the composition of the water-containing liquid mixture or water-containing steam mixture containing a separated liquid or the liquid largely comprises a three-component system of NMP-pDCB-water.

In the this three-component system of NMP-pDCB-water, it is known that the system exhibits a single-phase (homogeneous phase) state in the portion where the amount (concentration) of water is low, but the system exhibits a liquid-liquid two-phase (heterogeneous phase) state comprising a phase with a high pDCB concentration and a phase with a high water concentration as the amount (concentration) of NMP decreases and the amount (concentration) of water increases. This means that because NMP has affinity with pDCB or water, when the proportion of NMP increases, pDCB and water no longer exhibit a liquid-liquid two-phase state, and conversely, when the NMP concentration is low and the water concentration is high, a liquid-liquid two-phase state of pDCB and water becomes easy to achieve.

In this three-component system, in order to perform steam distillation so that NMP is obtained from the base of the steam distillation column and water (containing pDCB) is obtained from the top of the column—that is, in order to separate water and pDCB from the distillate from the top of the column—it is important for at least the vicinity of the top of the inside of the steam distillation column to be in a liquid-liquid two-phase (heterogeneous phase) state comprising a phase with a high pDCB concentration and a phase with a high water concentration. That is, one purpose of this steam distillation is to stably separate pDCB and water, and it is necessary for the three-component system to exhibit a liquid-liquid two-phase (heterogeneous phase) state comprising a phase with a high pDCB concentration and a phase with a high water concentration in at least the vicinity of the top of the steam distillation column.

In order to enable the steam distillation of a water-containing liquid mixture—that is, in order to achieve a heterogeneous phase (liquid-liquid two-phase state comprising pDCB and water) in at least the vicinity of the top of the column, it is specifically necessary to infer an amount ratio which yields a heterogeneous phase state comprising a phase with a high pDCB concentration and a phase with a high water concentration from the three-component phase diagram of NMP-pDCB-water at each temperature. That is, when the temperature and pressure at the top of the steam distillation column are determined, the amount ratio of pDCB and water distilled in the heterogeneous phase state is determined, which makes it possible to determine the amount of water that is necessary.

Therefore, in order to control the amount ratio of water in at least the vicinity of the top of the steam distillation column, the present inventors conceived of performing steam distillation on a water-containing liquid mixture or water-containing steam mixture containing a separated liquid, a washing discharge liquid, or the like, wherein the reflux ratio of water is adjusted rather than adjusting the amount of water by adding water to the water-containing liquid mixture or water-containing steam mixture prior to steam distillation or introducing steam into the steam distillation column so as to also serve as a heat source according to conventional technology.

That is, the present inventors discovered that by performing reflux in the vicinity of the top of the steam distillation column and adjusting the reflux ratio of water without adjusting the amount of water by newly adding water other than the refluxed water and without introducing steam into the steam distillation column so as to also serve as a heat source (in other words, without newly adding water to the water-containing liquid mixture or water-containing steam mixture introduced into the steam distillation column and without newly adding water to the base of the column in the form of steam or the like so as to also serve as a heat source), it is possible to easily achieve steam distillation inside the steam distillation column—that is, to achieve a heterogeneous phase state (liquid-liquid two-phase state of pDCB and water) in at least the vicinity of the top of the column.

At the same time, the present inventors discovered that by separating the distillate from the top of the steam distillation column into water and unreacted pDCB with the method described below, impurities contained in unreacted pDCB that may have an adverse effect on the polymerization reaction, such as phenol, for example, are reduced, which is an object of the present invention.

The following two mechanisms are presumed to be involved in this reduction in impurities. Firstly, it is presumed that impurities move into water due to liquid-liquid counterflow contact between pDCB (containing impurities) which ascends inside the column and water which descends inside the column in a state that could also be considered shower from the vicinity of the top of the column; and then, the impurities move from the water to NMP due to contact between the water and NMP in the vicinity of the middle part of the column; and the impurities return to the base of the column together with NMP, so that the impurities in the distillate at the top of the column was reduced. Secondly, it is presumed that in a liquid mixture of pDCB and water in the form of a condensate after being distilled from the top of the column, impurities move from pDCB into water while the liquid mixture is left to stand, and the impurities in the pDCB are thereby reduced.

As is also clear in the examples described below, this can also be confirmed from the fact that when the reflux ratio of water is increased, the phenol content in the PAS produced using recovered unreacted pDCB is reduced.
When this recovered unreacted pDCB was reused in the production of PAS, the produced PAS was comparable to PAS produced using commercially available pDCB from the perspectives of melt viscosity, thermal stability, and the like.

This means that NMP and water can be separated without a substantial effect on the component ratio—in particularly, the amount of water (water concentration)—of a water-containing liquid mixture or water-containing steam mixture introduced into the steam distillation column, that high-purity unreacted pDCB from which impurities have been removed can also be separated, that highly efficient, continuous operation can be confirmed, and that a high-cost device such as a rectification column or an intercooler is unnecessary.
That is, it is unnecessary to perform steam distillation in accordance with the types or amounts of impurities during or after the polymerization reaction for each production formula, and even if the production formula changes, the operation can be continued without needing to interrupt steam distillation.

Furthermore, the present inventors discovered that by using a stationary reflux device which efficiently separates unreacted pDCB and water utilizing the difference in specific gravity between the liquids, it is possible to selectively separate unreacted pDCB at the time of reflux. In this way, high-purity unreacted pDCB is recovered, and when the recovered pDCB is reused in the production of PAS, PAS can be stably produced. The present inventors thereby completed the present invention.

Solution to Problem

The present invention provides (1) a production method for producing PAS, the method including:
(a) a polymerization step of producing a polymerization reaction solution containing PAS by performing a polymerization reaction on at least one type of sulfur source selected from the group consisting of alkali metal sulfides and alkali metal hydrosulfides and DHA in an organic amide solvent;
(b) a separation step of separating the polymerization reaction solution obtained in the polymerization step into PAS and a separated liquid by solid-liquid separation; and
(c) a recovery step of recovering an unreacted dihalo aromatic compound from a water-containing mixture in the form of a water-containing liquid mixture containing the separated liquid by steam distillation entailing adjusting a reflux ratio of water in a steam distillation column without adding water other than refluxed water.

The present invention also provides (2) a production method for producing PAS, the method includes:
(a) a polymerization step of producing a polymerization reaction solution containing polyarylene sulfide by performing a polymerization reaction on a raw material mixture containing at least one type of sulfur source selected from the group consisting of alkali metal sulfides and alkali metal hydrosulfides and a dihalo aromatic compound in an organic amide solvent;
(d) a dehydration step of removing water content by steam distillation from a water-containing mixture in the form of a water-containing liquid mixture and/or a water-containing steam mixture containing the raw material mixture and/or a polymerization reaction solution during the polymerization reaction; and
(c) a recovery step of recovering an unreacted dihalo aromatic compound from the water-containing mixture by steam distillation entailing adjusting a reflux ratio of water in the steam distillation column without adding water other than refluxed water in the dehydration step.

The present invention also provides (3) the production method according to (1) or (2), wherein the recovery step (c) is a recovery step of separating water-containing unreacted DHA and an organic amide solvent from the water-containing mixture by steam distillation entailing adjusting a reflux ratio of water in the steam distillation column without adding water other than refluxed water, and recovering unreacted DHA from the water containing the unreacted DHA.

The present invention also provides (4) the production method according to any one of (1) to (3), wherein the steam distillation in the recovery step (c) is performed with a steam distillation column having a stationary reflux device.

The present invention also provides (5) the production method according to (1) or (2), wherein the recovery step (c) is (c') a recovery step of recovering unreacted DHA from the water-containing mixture by steam distillation entailing adjusting a reflux ratio of water in the steam distillation column without adding water other than refluxed water, and further purifying the unreacted DHA.

The present invention also provides (6) the production method according to (5), wherein the purification in the recovery step (c') is distillation.

The present invention also provides (7) the production method according to (1) or (2), wherein a reflux ratio of water is from 0.1 to 30, the reflux ratio of water being calculated using water discharged without being refluxed as a denominator and using refluxed water as a numerator out of the water in the distillate from the top of the steam distillation column. The present invention also provides (8) the production method according to (1), further comprising (b') a washing step of washing the PAS separated in the separation step between the separation step (b) and the recovery step (c), wherein the water-containing mixture in the recovery step (c) at this time is a water-containing liquid mixture containing the separated liquid and a washing discharge liquid recovered in the washing step.

The present invention also provides (9) the production method according to (1), (2), or (5) further comprising (e) a reusing step of reusing the unreacted DHA recovered in the recovery step as part or all of the DHA in the polymerization step after the recovery step (c) or the recovery step (c').

The present invention also provides (10) a PAS produced by the production method according to (8), wherein a melt viscosity measured at a temperature of 310° C. and a shear rate of 1,216 $sec^{-1}$ is from 0.5 to 5,000 Pa·s, and an average particle size is from 100 to 5,000 μm.

Advantageous Effects of Invention

With the present invention, it becomes possible to selectively separate and recover high-purity unreacted DHA at the time of the recovery of an organic amide solvent. At the same time, PAS can be stably produced even when the recovered unreacted DHA is reused.

In addition, with the present invention, it becomes possible to selectively separate and recover high-purity unreacted DHA at the time of dehydration during the polymerization reaction. At the same time, PAS can be stably produced even when the recovered unreacted DHA is used. Furthermore, even when a water-containing liquid mixture or water-containing steam mixture containing the polymerization reaction solution and separated liquid for each production formula is used, highly efficient operability can be ensured by adjusting the reflux ratio of water without adjusting the amount of water by newly adding water other than the refluxed water or without introducing steam serving as a heat source (in other words, without adding water).

As a result, reusing the recovered unreacted DHA makes it possible to reduce the production cost, which enhances the competitive power of PAS as a plastic. It also becomes possible to reduce waste, which contributes to a solution to resource and environmental problems. Furthermore, a shaped product obtained using the PAS produced stably by the production method of the present invention can be used in a wide range of technical fields such as electrical and electronic part materials, automobile equipment part materials, chemical equipment part materials, and water section part materials.

DESCRIPTION OF EMBODIMENTS

1. PAS Production Method

Figure 1:
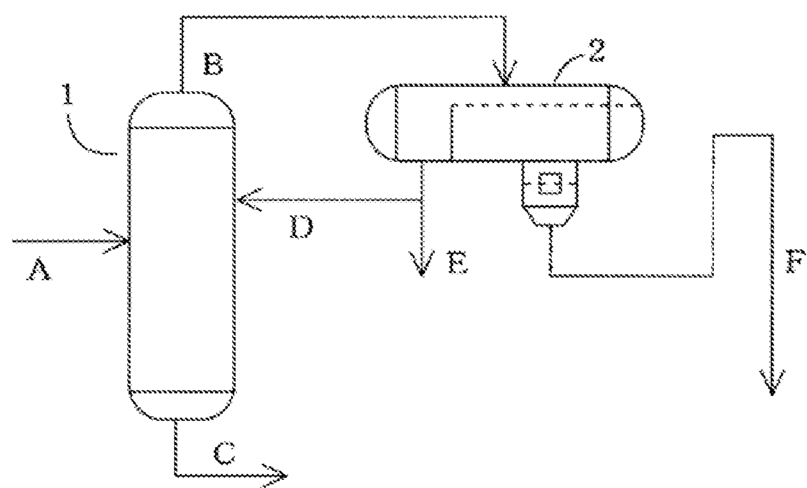
FIG. 1 is a schematic view of the steam distillation of the present invention.

PAS is produced by a production method including a polymerization step and a separation step. Specifically, the PAS production method of the present invention includes: (a) a polymerization step of producing a polymerization reaction solution containing PAS by performing a polymerization reaction on at least one type of sulfur source selected from the group consisting of alkali metal sulfides and alkali metal hydrosulfides and DHA in an organic amide solvent; and (b) a separation step of separating the polymerization reaction solution obtained in the polymerization step into PAS and a separated liquid by solid-liquid separation.

In addition, the polymerization step described above may also include a dehydration step of performing dehydration (from the raw material mixture or the polymerization reaction solution).

1. Sulfur Source

At least one type of sulfur source selected from the group consisting of alkali metal sulfides and alkali metal hydrosulfides is used as the sulfur source. Examples of the alkali metal sulfide include lithium sulfide, sodium sulfide, potassium sulfide, rubidium sulfide, cesium sulfide, and a mixture of two or more of these.

Of these, sodium sulfide and lithium sulfide are preferred from the perspective of the low cost of obtaining it for industrial purposes.

Examples of the alkali metal hydrosulfide include lithium hydrosulfide, sodium hydrosulfide, potassium hydrosulfide, rubidium hydrosulfide, cesium hydrosulfide, and a mixture of two or more of these. Of these, sodium hydrosulfide and lithium hydrosulfide are preferred from the perspective of the low cost of obtaining it for industrial purposes.

A small amount of alkali metal hydrosulfide may be contained within the alkali metal sulfide. A small amount of alkali metal sulfide may be contained within the alkali metal hydrosulfide. In these cases, the total molar quantity of the alkali metal sulfide and alkali metal hydrosulfide is that of the sulfur source accompanying the polymerization reaction in the polymerization step after the dehydration step implemented where necessary; in other words the "charged sulfur source".

When the alkali metal sulfide and alkali metal hydrosulfide are mixed and used, then naturally, the mixture of the two will be the charged sulfur source.

When the sulfur source contains an alkali metal hydrosulfide, an alkali metal hydroxide is used as well. Examples of the alkali metal hydroxide include lithium hydroxide, sodium hydroxide, potassium hydroxide, rubidium hydroxide, cesium hydroxide, and a mixture of two or more of these. Of these, sodium hydroxide and lithium hydroxide are preferred from the perspective of the low cost of obtaining it for industrial purposes.

2. Dihalo Aromatic Compound

A dihalo aromatic compound (DHA) is a dihalogenated aromatic compound having two halogen atoms bonded directly to an aromatic ring. Halogen atoms include atoms of fluorine, chlorine, bromine, and iodine, and in the same dihalo aromatic compound, two halogen atoms may be the same or different. These dihalo aromatic compounds may be used alone or in a combination of two or more types. Specific examples of the dihalo aromatic compounds include o-dihalobenzene, m-dihalobenzene, p-dihalobenzene, dihalotoluene, dihalo naphthalene, methoxy-dihalobenzene, dihalobiphenyl, dihalobenzoic acid, dihalo diphenyl ether, dihalo diphenyl sulfone, dihalodiphenyl sulfoxide, dihalodiphenyl ketone. Of these, p-dihalobenzene, m-dihalobenzene or a mixture of these two is preferred, p-dihalobenzene is more preferred, and p-dichlorobenzene (pDCB) is particularly preferred.

3. Branching/Cross-Linking Agent

In order to introduce a branched or crosslinked structure into the produced PAS, trihalobenzene is preferable as a polyhalo compound bonded with three or more halogen atoms (not necessarily an aromatic compound) and a polyhalo compound serving as a branching/crosslinking agent.

4. Organic Amide Solvent

An organic amide solvent that is an aprotonic polar organic solvent is used as a dehydration reaction and polymerization reaction solvent. Specific examples of the organic amide solvent include amide compounds, such as N,N-dimethylformamide and N,N-dimethylacetamide; N-alkylcaprolactam compounds, such as N-methyl-ε-caprolactam; N-alkylpyrrolidone compounds or N-cycloalkylpyrrolidone compounds, such as N-methyl-2-pyrrolidone and N-cyclohexyl-2-pyrrolidone; N,N-dialkylimidazolidinone compounds, such as 1,3-dialkyl-2-imidazolidinone; tetraalkyl urea compounds, such as tetramethyl urea; and hexaalkylphosphoric triamide compounds, such as hexamethylphosphoric triamide. These organic amide solvents may be used alone, or in a combination of two or more types.

Of these organic amide solvents, an N-alkyl pyrrolidone compound, an N-cycloalkyl pyrrolidone compound, an N-alkyl caprolactam compound, and an N, N-dialkyl imidazolidinone compound are preferred; in particular, N-methyl-2-pyrrolidone (NMP), N-methyl-ε-caprolactam, and 1,3-dialkyl-2-imidazolidinone are more preferred, and NMP is most preferred.

5. Polymerization Aid

Where required, to promote the polymerization reaction, various types of polymerization aid may be used. Specific examples of the polymerization aids include well-known typical polymerization aids for PAS including water, organic carboxylic acid metal salt, organic sulfonic acid metal salt, alkali metal halides such as halogenated lithium, alkaline earth metal halide, alkaline earth metal salt of aromatic carboxylic acid, phosphoric acid alkali metal salt, alcohols, paraffin hydrocarbon, or a mixture of two or more of these. An alkali metal carboxylate is preferred as the organic carboxylic acid metal salt. Examples of the alkali metal carboxylate include lithium acetate, sodium acetate, potassium acetate, sodium propionate, lithium valerate, lithium benzoate, sodium benzoate, sodium phenyl acetate, potassium p-tolulate, or a mixture of two or more of these. Sodium acetate is particularly preferred as an alkali metal carboxylate due to the low cost of obtaining it. The amount of polymerization aid used depends on the type of compound, but is typically in the range of 0.01 to 10 mol, preferably 0.1 to 2 mol, more preferably 0.2 to 1.8 mol, and particularly preferably 0.3 to 1.7 mol per 1 mol of charged sulfur source.

When the polymerization aid is an organic carboxylic metal salt, organic sulfonate, or alkali metal halide, the upper limit for use is preferably 1 mol or less, and more preferably 0.8 mol or less per 1 mol of charged sulfur source.

6. Phase Separation Agent

Various phase separation agents may be used in order to accelerate the polymerization reaction and achieve a high degree of polymerization in PAS in a short period of time, or to cause phase separation and obtain granular PAS. Phase separation agents are compounds that dissolve in an organic amide solvent either on their own or in the presence of a small amount of water, and reduce the solubility of PAS in an organic amide solvent. The phase separation agent itself is a compound that is not a PAS solvent.

A publicly known compound that is known to function as a phase separation agent may be used as the phase separation agent. Phase separation agents include the compounds used as the above described polymerization aid, but here, "phase separation agent" indicates a compound that can be used in the quantitative ratio that allows it to function as a phase separation agent in a step that implements a polymerization reaction in a phase-separated state, in other words a phase-separated polymerization step, or in the quantitative ratio sufficient to cause phase separation in the present of the phase separation agent after the completion of polymerization. Specific examples of the phase separation agent include water, organic carboxylic acid metal salt, organic sulfonic acid metal salt, alkali metal halides such as halogenated lithium, alkaline earth metal halide, alkaline earth metal salt of an aromatic carboxylic acid, phosphoric acid alkali metal salt, alcohols, and paraffin hydrocarbons. Preferred examples of the organic carboxylic acid metal salt include lithium acetate, sodium acetate, potassium acetate, sodium propionate, lithium valerate, lithium benzoate, sodium benzoate, sodium phenyl acetate, and an alkali metal carboxylate such as potassium p-tolulate. These phase separation agents may be used alone, or in a combination of two or more types. Of these phase separation agents, either water, which is inexpensive to obtain and easy to post-process, or a mixture of water and an organic carboxylic acid metal salt such as alkali metal carboxylate is particularly preferred.

Even when water is used as the phase separation agent, it is possible to use a phase separation agent other than water as a polymerization aid in combination with water, from the perspective of implementing phase-separated polymerization efficiently. When both water and a phase separation agent other than water may be used together during the phase-separated polymerization step, the total amount thereof may be any amount that allows phase separation to be implemented. At least part of the phase separation agent may be contained from the time the polymerization reaction component is prepared, but it is preferable to add the phase separation agent during the polymerization reaction, or to adjust the amount of the phase separation agent to an amount sufficient to form phase separation after the polymerization reaction.

II. Polymerization, Separation, and Washing

The production of PAS is implemented by performing a polymerization reaction on at least one type of sulfur source selected from the group consisting of alkali metal sulfides and alkali metal hydrosulfides, and DHA in an organic amide solvent. That is, in the present invention, the polymerization step (a) of producing a polymerization reaction solution containing PAS by performing a polymerization reaction on at least one type of sulfur source selected from the group consisting of alkali metal sulfides and alkali metal hydrosulfides, and DHA in an organic amide solvent is essential.

In addition, a preferable polymerization step of the present invention is a polymerization step of producing a polymerization reaction solution containing PAS by performing a polymerization reaction on at least one type of sulfur source selected from the group consisting of alkali metal sulfides and alkali metal hydrosulfides, and DHA in an organic amide solvent containing water originating from a polymerization aid, a phase separation agent, or the like.

Any polymerization method may be used in the present invention, provided that the method does not impair the present invention, and is a polymerization method resulting in the production of PAS.

In general, polymerization methods for manufacturing granular PAS can be broadly classified into (i) methods wherein the polymerization step includes a phase-separated polymerization step, and after phase-separated polymerization, gradual cooling is implemented, (ii) methods wherein a phase separation agent is added after the polymerization reaction, and gradual cooling is implemented, (iii) methods using lithium chloride or other polymerization aids, and (iv) methods wherein the gas phase portion in the reactor is cooled.

Of these, since when granular PAS is manufactured using a polymerization method including a polymerization reaction step implemented under phase-separated conditions, wherein polymerization conditions are controlled, and a concentrated polymer phase and a diluted polymer phase are present in the polymerization reaction system in the presence of a phase separation agent (hereinafter sometimes referred to as a "phase-separated polymerization step"), granular PAS with a high degree of polymerization can be obtained, the sieving efficiency in the separation step becomes high, and the yield or productivity is enhanced. Accordingly, this polymerization method is advantageous in raising the yield of PAS of a granular product with a high degree of polymerization. This polymerization step is described in detail.

1. Charging Step

The polymerization step included in the production method for producing PAS can be implemented after the charging step described below.

The charging step involves mixing the mixture remaining within the system after the dehydration step performed as necessary with DHA, and adding an alkali metal hydroxide and water to the mixture as necessary to prepare a charged mixture containing an organic amide solvent, a sulfur source (charged sulfur source), water, and DHA.

The amount of DHA used is typically from 0.90 to 1.50 mol, preferably from 0.92 to 1.10 mol, and more preferably from 0.95 to 1.05 mol per 1 mol of the charged sulfur source. When the charged mol ratio of DHA to the sulfur source is too large, it becomes difficult to produce a high molecular weight polymer. On the other hand, when the charged mol ratio of DHA to the sulfur source is too small, it becomes easier for a degradation reaction to occur, and difficult to implement a stable polymerization reaction.

When an alkali metal hydrosulfide is used as a charged sulfur source, the amount of the alkali metal hydrosulfide used is typically from 0.95 to 1.09 mol, preferably from 0.98 to 1.085 mol, and more preferably from 0.99 to 1.083 mol per 1 mol of the charged sulfur source.

The sulfur source used in the charging step is referred to as the "charged sulfur source" in order to distinguish it from the sulfur source used in the dehydration step. The reason for this is that prior to the dehydration step, the amount of sulfur source charged into the reaction vessel varies according to the dehydration step. The charged sulfur source is consumed by the reaction with DHA during the polymerization step, and the charged sulfur source molar quantity is based on the molar quantity in the charging step. The amount of the charged sulfur source is calculated using the equation "charged sulfur source"="mol of total charged sulfur"−"mol of volatalized sulfur after dehydration".

In the charging step, the amount of organic amide solvent is typically from 0.1 to 10 kg, preferably from 0.13 to 5 kg, and more preferably from 0.15 to 2 kg per 1 mol of charged sulfur source.

2. Polymerization Step

In the polymerization step, the charged mixture prepared in the aforementioned charging step is heated typically to a temperature from 170 to 290° C., preferably from 180 to 280° C., and more preferably from 190 to 275° C. before the polymerization reaction is started, in order to progress the polymerization. The polymerization reaction time is typically in the range of 10 minutes to 72 hours, and preferably 30 minutes to 48 hours. The polymerization reaction is preferably implemented in two stages, in the form of a pre-stage polymerization step and a post-stage polymerization step.

In this polymerization step, a polymerization reaction is performed on at least one type of sulfur source selected from the group consisting of alkali metal sulfides and alkali metal hydrosulfides and DHA in an organic amide solvent, wherein the polymerization reaction occurs in a phase-separated state with a concentrated polymer phase and a diluted polymer phase being present in the polymerization reaction system in the presence of a phase separation agent. The polymerization reaction is performed at a temperature from 170 to 290° C. The phase separation agent is preferably water, as described above, or any compound known to function as a phase separation agent.

Furthermore, in the polymerization step, it is preferable that: a polymerization reaction is performed on at least one type of sulfur source selected from the group consisting of alkali metal sulfides and alkali metal hydrosulfides and DHA in an organic amide solvent at a temperature from 170 to 270° C.; at the point at which the conversion ratio of DHA reaches 30% or greater, a phase separation agent is added to the polymerization reaction mixture to cause the phase separation agent to be present within the polymerization reaction system; after which the temperature of the polymerization reaction mixture is raised to a temperature from 245 to 290° C.; and the polymerization reaction is continued in a phase-separated state with a concentrated polymer phase and a diluted polymer phase present in the polymerization reaction system in the presence of a phase separation agent.

Furthermore, in the polymerization step, it is preferable for the polymerization reaction to be carried out in a two-stage polymerization step including: a pre-stage polymerization step of performing a polymerization reaction on at least one type of sulfur source selected from the group consisting of alkali metal sulfides and alkali metal hydrosulfides and DHA in an organic amide solvent, wherein the produced polymer has a DHA conversion ratio of 30% or greater and preferably from 80 to 99%, and a post-stage polymerization step of continuing the polymerization reaction in a phase-separated state with a concentrated polymer phase and a diluted polymer phase present in the polymerization reaction system in the presence of a phase separation agent.

Specifically, in the polymerization step, it is preferable to perform the polymerization reaction in an at least two-stage polymerization step including: a pre-stage polymerization step of performing a polymerization reaction on at least one type of sulfur source selected from the group consisting of alkali metal sulfides and alkali metal hydrosulfides and DHA in an organic amide solvent, with from 0.01 to 2.0 mol water being present per 1 mol of charged sulfur source, and the temperature being from 170 to 270° C., wherein the produced polymer has a DHA conversion ratio from 80 to 99%; and a post-stage polymerization step of continuing the polymerization reaction in a phase-separated state, with a concentrated polymer phase and a diluted polymer phase present in the polymerization reaction system, by not only adjusting the amount of water in the polymerization reaction system so that greater than 2.0 mol but 10 mol or less of water per 1 mol charged sulfur source is present, but also heating to from 245 to 290° C.

The DHA conversion ratio is the value calculated by the following equation. In cases in which DHA is added in an excessive amount in terms of the molar ratio in comparison to the sulfur source, the conversion ratio is calculated by the following equation:

conversion ratio=[[DHA charged amount (mol)−DHA residual amount (mol)]/[DHA charged amount (mol)—DHA excess amount (mol)]]×100.

In other cases, the conversion ratio is calculated by the following equation:

conversion ratio=[[DHA charged amount (mol)−DHA residual amount (mol)]/[DHA charged amount (mol)]]×100.

The coexisting water amount in the reaction system in the pre-stage polymerization step is typically within the range of 0.01 to 2.0 mol, preferably 0.05 to 1.8 mol, more preferably 0.5 to 1.6 mol, and particularly preferably 0.8 to 1.5 mol per 1 mol of charged sulfur source.

In the pre-stage polymerization step, it is typically preferable to produce a polymer (sometimes referred to as a pre-polymer) having a melt viscosity from 0.1 to 30 Pa·s as measured at a temperature of 310° C., and a shear speed of 1,216 $sec^{-1}$.

The post-stage polymerization step is not simply a separating/granulating step for the polymer (pre-polymer) produced during the pre-stage polymerization step, but is also intended to increase the degree of polymerization of the aforementioned polymer.

In the post-stage polymerization step, it is particularly preferable to use water as the phase separation agent, and preferable to adjust the amount of water so that there is from greater than 2.0 mol to 10 mol or less, preferably from greater than 2.0 mol to 9 mol or less, more preferably from 2.1 to 8 mol, and particularly preferably from 2.2 to 7 mol of water in the polymerization reaction system per 1 mol of charged sulfur source. In the post-stage polymerization step, if the amount of coexisting water in the polymerization reaction system is 2.0 mol or less or greater than 10 mol per 1 mol of charged sulfur source, the degree of polymerization of the produced PAS may fall. In particular, it is preferable if the post-stage polymerization is implemented with the amount of coexisting water in the range of 2.2 to 7 mol, PAS with a high degree of polymerization will be obtained.

As an even more preferred production method, water and a phase separation agent other than water may be used in combination as the phase separation agent in order to implement polymerization with a small amount of phase separation agent. In this aspect, it is preferable for the amount of water in the polymerization reaction system to be in the range of 0.1 to 10 mol, preferably 0.3 to 10 mol, more preferably 0.4 to 9 mol, and particularly preferably 0.5 to 8 mol per 1 mol of charged sulfur source, and for the amount of the separation agent other than water to be in the range of 0.001 to 3 mol per 1 mol of charged sulfur source. Other phase separation agents preferred for using in combination with water include organic carboxylic acid metal salts, particularly alkali metal carboxylates, in which case the amount of water per 1 mol of charged sulfur source is in the range of 0.5 to 10 mol, preferably 0.6 to 7 mol, and particularly preferably 0.8 to 5 mol, while the amount of alkali metal carboxylate is in the range of 0.001 to 0.7 mol, preferably 0.02 to 0.6 mol, and particularly preferably 0.05 to 0.5 mol.

The polymerization temperature in the post-stage polymerization step is in the range of 245 to 290° C.; when the polymerization temperature is below 245° C. it is difficult to obtain PAS having a high degree of polymerization, while when it exceeds 290° C., the PAS and organic amide solvent may be degraded. In particular, the temperature range of 250 to 270° C. is preferable in that a PAS having a high degree of polymerization is easy to obtain.

3. The Dehydration Step, if Desired

In the production of PAS, a dehydration step may be implemented as desired prior to the charging step when the polymerization step is implemented, and/or during the charging step, and/or during the polymerization step.

In the dehydration step, water including hydrated water (crystal water), aqueous medium, byproduct water, and the like are dehydrated to within the required range. The dehydration step may be implemented, for example, by steam distillation. Specifically, the dehydration step may be implemented by steam distillation with a steam distillation column.

During the dehydration step, the coexisting water amount in the polymerization reaction system is dehydrated so that it is within the range typically of 0.01 to 2.0 mol, preferably 0.05 to 1.8 mol, and more preferably 0.5 to 1.6 mol per 1 mol of charged sulfur source. As described above, the sulfur source after the dehydration step and before the start of the polymerization step is referred to as the “charged sulfur source”. When the amount of water is reduced too much in the dehydration step prior to or during charging, water may be added prior to the polymerization step to adjust the amount to the desired amount of water.

When alkali metal hydrosulfide is used as the sulfur source, then it is preferable that in the dehydration step a mixture containing from 0.9 to 1.1 mol, preferably from 0.91 to 1.08 mol, more preferably from 0.92 to 1.07 mol, and particularly preferably from 0.93 to 1.06 mol of alkali metal hydroxide per 1 mol of organic amide solvent, alkali metal hydrosulfide, and the aforementioned alkali metal hydrosulfide is heated and allowed to react, and at least part of the distillate containing water from the system containing the mixture is discharged outside of the system.

4. Separation Step

The PAS production method of the present invention includes (b) a separation step of separating the polymerization reaction solution obtained in the polymerization step into PAS and a separated liquid by solid-liquid separation.

In the PAS production method, the separation recovery process for PAS after the polymerization step may be implemented, for example, by a separation step using a sieve. Once the polymerization reaction has been completed, the separation step may be implemented using a sieve to separate and recover PAS from a reaction solution containing produced PAS, after the product slurry is cooled and diluted with water as necessary.

According to the PAS production method of the present invention, granular PAS can be produced. As a result, separation via a sieve with a screen can be implemented. Furthermore, the product slurry can be sieved to separate PAS at high temperatures, without the need to cool it to room temperature.

The aperture size of the screen used for separation by sieving in the separation step is typically from 75 μm (200 mesh) to 180 μm (80 mesh), and preferably from 90 μm (170 mesh) to 150 μm (100 mesh). At least one screen within this range may be used, or multiple screens may also be used. Typically a screen with aperture size of 150 μm (100 mesh) is often used.

The recovery ratio of PAS recovered as product is calculated as the entire amount of PAS obtained, based on the mass (theoretical amount) of PAS when it is assumed that all the effective sulfur component within the charged sulfur source present in the reaction vessel after the dehydration step prior to or during charging has been converted into PAS. This recovery ratio also depends on the screen aperture size of the sieve, but when at least one screen with an aperture size from 75 μm (200 mesh) to 180 μm (80 mesh) is used, the ratio will typically be 80 mass % or greater, in some cases 83 mass % or greater, and in some cases 85 mass % or greater. The maximum recovery ratio is approximately 99.5 mass %.

Furthermore, the average particle size of the obtained PAS also depends on the sieve screen aperture size, but when using at least one screen in the range of 75 μm (200 mesh) to 180 μm (80 mesh), the average particle size is typically from 100 to 5,000 μm, preferably from 120 to 3,000 μm, and more preferably from 130 to 1,500 μm.

The melt viscosity of the obtained PAS also depends on the sieve screen aperture size, but when at least one screen in the range of 75 μm (200 mesh) to 180 μm (80 mesh) is used, the melt viscosity of the PAS is typically from 0.5 to 5,000 Pa·s, preferably from 1 to 4,500 Pa·s, and more preferably from 2 to 4,000 Pa·s as measured under conditions with a temperature of 310° C. and a shear rate of 1,216 $sec^{-1}$.

5. Washing Step

In order to minimize NMP adhering to the PAS, unreacted DHA, unreacted sulfur source, by-produced alkali metal salts produced in the polymerization step, and the like, the PAS production method of the present invention may include a washing step of performing washing treatment on the PAS separated by the separation step as desired using at least one type of washing liquid selected from the group consisting of water, organic solvents, and mixed solutions of water and organic solvents.

The organic solvent used in washing treatment is preferably the same organic amide solvent as the polymerization solvent or a hydrophilic organic solvent such as a ketone (for example, methyl ethyl ketone or acetone) or an alcohol (for example, methanol, ethanol, isopropanol, or hexanol). One type of these may be used alone, or a plurality of types may be mixed and used. The organic solvent is preferably acetone from the perspectives of an excellent effect of removing impurities (low-molecular-weight components) such as oligomers and decomposition products, and economic efficiency or safety.

It is more preferable to use a mixed solution of water and acetone as a washing liquid. As a mixed solution, it is preferable to use a water-containing liquid mixture in which the proportion of water is preferably from 1 to 60 mass %, more preferably from 1 to 30 mass %, and particularly preferably from 1 to 20 mass % from the perspective of enhancing the removal efficiency of organic impurities such as oligomers or decomposition products.

In addition, in the PAS production method of the present invention, in addition to washing treatment using at least one type of washing liquid selected from the group consisting of water, organic solvents, and mixed solutions of water and organic solvents, acid washing for stabilizing the terminal groups of the PAS using aqueous solutions of inorganic acids (for example, hydrochloric acid), organic acids (for example, acetic acid), salts thereof (for example, ammonium chloride), and the like may be performed before or after the washing treatment described above.

In the washing step, the washed PAS is separated from the washing liquid using a screen, a centrifugal separator, or the like. If filtration is performed using a screen, a wet cake of a PAS having a liquid content of ordinarily from 30 to 75 mass % and, in many cases, from approximately 40 to approximately 65 mass % is obtained. In addition, the washing liquid used in the washing step and the water or the like used to wash the wet cake is recovered in a recovery tank as a washing discharge liquid.

III. Unreacted DHA Recovery Step

One embodiment of the PAS production method of the present invention is a production method which necessarily includes (c) a recovery step of recovering unreacted DHA from a water-containing liquid containing the separated liquid by steam distillation entailing adjusting the reflux ratio of water in the steam distillation column without adding water other than refluxed water. In this case, “without adding water” means that water other than the refluxed water is not newly added to the water-containing liquid mixture in order to adjust the amount of water, and that steam also serving as a heat source is also not introduced.

In addition, another embodiment of the PAS production method of the present invention is a production method which necessarily includes (c) a recovery step of recovering an unreacted dihalo aromatic compound from the water-containing liquid mixture and/or water-containing steam mixture containing the raw material mixture and/or the polymerization reaction solution by steam distillation entailing adjusting a reflux ratio of water in the steam distillation column without adding water other than refluxed water in the dehydration step. In this case, “without adding water” means that water other than the refluxed water is not newly added to the water-containing liquid mixture and/or water-containing steam mixture in order to adjust the amount of water, and that steam also serving as a heat source is also not introduced.

In addition, the recovery step is preferably a recovery step of separating water-containing unreacted DHA and an organic amide solvent from the water-containing liquid mixture and/or the water-containing steam mixture by steam distillation entailing adjusting the reflux ratio of water in the steam distillation column without adding water other than the refluxed water, and recovering unreacted DHA from the water-containing the unreacted DHA.

In addition to the separated liquid recovered in the separation step, the washing discharge liquid recovered in the washing step, which is implemented as desired, may also be mixed into the water-containing liquid mixture containing the separated liquid and used.

That is, the PAS production method of the present invention preferably further includes a washing step of washing the PAS separated in the separation step between the separation step and the recovery step, wherein the water-containing mixture in the recovery step at this time is a water-containing liquid mixture containing the separated liquid and a washing discharge liquid recovered in the washing step.

1. Recovery of Organic Solvent from Water-Containing Liquid Mixture

When the water-containing liquid mixture contains a washing discharge liquid—in particular, when an organic solvent such as alcohol or acetone is used as a washing liquid—the organic solvent such as alcohol or acetone is first separated and recovered from the water-containing liquid mixture prior to the unreacted DHA recovery step. When the organic solvent is acetone, a low-boiling-point organic solvent can be separated easily by distillation, and a distillation column for recovering the organic solvent should be provided.

In this case, the top of the column is set to the range of 20 to 95° C., close to the boiling point of the organic solvent that is used, and the water-containing liquid mixture is guided into the distillation column for recovering the organic solvent. The organic solvent is recovered from the top of the column, and a water-containing liquid mixture containing unreacted DHA, water, an organic amide solvent, and the like—that is, a water-containing liquid mixture containing impurities and containing unreacted DHA, water, an organic amide solvent, and the like—is recovered from the base of the column. The organic solvent recovered from the top of the column is reused as a washing liquid.

2. Recovery of Unreacted DHA from Water-Containing Liquid Mixture

The organic solvent such as alcohol or acetone is separated and recovered using the distillation column for recovering the organic solvent, and the water-containing liquid mixture recovered from the base of the distillation column is separated into a column base fraction and a column top fraction by steam distillation entailing using a steam distillation column with a reflux device to adjust the reflux ratio of water in the steam distillation column without adding water other than the refluxed water.

In the reflux device, the column top fraction emerging from the top of the column is condensed, and water and unreacted DHA are separated from the column top fraction. That is, the column top fraction is separated into water containing impurities in a soluble state (also simply abbreviated as "water" hereafter) and unreacted DHA. For example, when the DHA is pDCB, the melting point is 53.5° C., so it is preferable to perform settled separation with water at a temperature equal to or higher than the melting point.

Accordingly, the water at the top and the unreacted DHA at the bottom are preferably separated by leaving the components to stand.

Based on the reflux ratio of the water, part of the water at the top is refluxed into the steam distillation column, and the remainder is discharged together with impurities. That is, the reflux ratio is calculated using water discharged without being refluxed as a denominator and using refluxed water as a numerator out of the water in the distillate from the top of the steam distillation column.

The unreacted DHA at the bottom is detected and recovered visually or with a detection device such as a densitometer or a manometer.

Steam distillation in the recovery step of the PAS production method of the present invention is preferably performed with a steam distillation column having a stationary reflux device.

Furthermore, the stationary reflux device may use a method of visually detecting the boundary between unreacted DHA and water and performing an extraction operation, or a method of extracting by automatic control entailing detecting the level of the boundary between unreacted DHA and water using pressure (or detecting with a sensor capable of detecting the difference between unreacted DHA and water (a sensor such as a gravimeter or a refractive index meter)), opening an extraction valve when specific conditions are met, and closing the extraction valve when the level drops below a specific value.

FIG. 1 is a schematic view of a steam distillation column (1) having a stationary reflux device (2), wherein a water-containing liquid mixture containing a separated liquid is guided into the steam distillation column (1) having a stationary reflux device (2) and separated into a column base fraction (C) and a column top fraction (B).

The column top fraction (B) of the steam distillation column is condensed by cooling with a condenser (not illustrated), guided into the stationary reflux device (2), and separated into unreacted DHA (F) and water (D, E) containing impurities in a soluble state. Part of the water (D) is refluxed in accordance with the reflux ratio. The column base is heated with a heater (not illustrated).

When pDCB is used as DHA and NMP is used as an organic amide solvent, the boiling point of pDCB at atmospheric pressure is 174° C., which is lower than the boiling point of 202° C. of NMP. Therefore, by setting the temperature of the column base at atmospheric pressure to 190 to 230° C. and preferably to 200 to 220° C., water and pDCB are separated and recovered as steam at the top of the steam distillation column, and NMP having a high boiling point is separated and recovered at the base of the column. The temperature of the top of the column at atmospheric pressure is ordinarily from 90 to 110° C. and preferably from 95 to 105° C. However, these temperatures vary depending on the operating pressure of the steam distillation column.

The column top fraction (B) of the steam distillation column is condensed by cooling to form liquid pDCB and water. The melting point of pDCB is 53.5° C., so the cooling temperature is not lower than this temperature.

Figure 2:
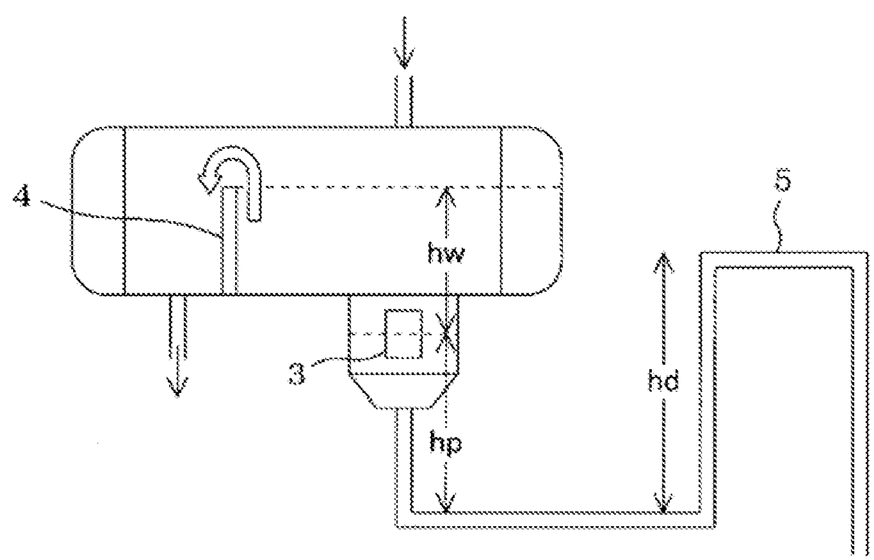
FIG. 2 is a schematic view of the stationary reflux device of the present invention.

Liquid pDCB (in the case of a solid, the density is approximately 1.25 g/cm$^3$) and water can be separated based on the difference in liquid specific gravity. At this time, a stationary reflux device having the partition plate (4) illustrated in FIG. 2 is used, and water with a light liquid specific gravity is partitioned and separated into two segments using the partition plate (4) so that part of the water is refluxed into the steam distillation column in accordance with the reflux ratio of the water. In addition, water that is not refluxed is discharged together with impurities after being subjected to wastewater treatment as necessary.

Furthermore, pDCB having a heavy liquid specific gravity at the base of the stationary reflux device is set using a siphon (5) so that the boundary between pDCB and water is aligned with an inspection window (3) of the discharge part, and only pDCB is recovered while observing the composition through the inspection window (3).

FIG. 2 is a schematic view of the separation of water and pDCB in the stationary reflux device, wherein the following equation is established for the height (hd) of pDCB in the siphon tube (5) in terms of the height (hw) of water up to the boundary, the height (hp) of pDCB, the density (ρw) of water, and the density (ρp) of pDCB.

$$hd=hw\times(\rho w/\rho p)+hp$$

In this way, unreacted pDCB is recovered by a simple stationary reflux device. A stationary reflux device is a device provided with a partition plate in a horizontal tank so as to divide the tank into two; a discharge port at the base of one of the partition parts; a discharge part having an inspection window communicating with the base at the base of one of the partition parts; a discharge port on the discharge part; and a reverse U-shaped siphon tube on the discharge port.

Adjusting the reflux ratio of water in steam distillation means to continuously control the amount of water (water concentration) in the column so that steam distillation is possible—that is, to continuously control the amount of water in at least the vicinity of the top of the column so as to achieve a heterogeneous phase state (liquid-liquid two-phase state of unreacted pDCB and water).

In general, when the temperature and pressure inside the steam distillation column are determined, the range of the ratio of pDCB and water in a heterogeneous phase state (liquid-liquid two-phase state of pDCB and water) according to the phase diagram of a three-component system comprising NMP-pDCB-water is determined, and the range of the reflux ratio of water for satisfying the required amount of water is thereby determined.

This means that because NMP, which has affinity with both pDCB and water, is contained in the three-component system comprising NMP-pDCB-water, it is necessary for the NMP concentration to be low and for the water concentration to be high in order to achieve a heterogeneous phase state (liquid-liquid two-phase state of pDCB and water). That is, there is practically no NMP present in the vicinity of the top of the steam distillation column, so water should be refluxed in order to achieve a heterogeneous phase state (liquid-liquid two-phase state of pDCB and water).

Specifically, because there is practically no NMP present in the vicinity of the top of the steam distillation column, the partial pressure of water added to the partial pressure of pDCB becomes equal to the total pressure. Accordingly, the ratio of pDCB and water in the distillate becomes constant, regardless of the amount of pDCB in the water-containing liquid mixture. The reflux ratio needs to be determined so that all of the pDCB in the water-containing liquid mixture introduced into the steam distillation column can be recovered using the composition of this distillate.

The reflux ratio is calculated using water discharged without being refluxed as a denominator and using refluxed water as a numerator out of the water in the distillate from the top of the steam distillation column, but the reflux ratio is ordinarily from 0.1 to 30, preferably from 0.2 to 15, and more preferably from 0.4 to 7.5.

When the reflux ratio is too large, the cost of recovering pDCB—that is, the thermal energy—increases, and when the reflux ratio is low, there is an increase in impurities in the pDCB. Furthermore, when the reflux ratio is extremely low, it becomes difficult to recover the entire amount of pDCB contained in the water-containing liquid mixture.

The recovery rate of the unreacted DHA recovered by steam distillation in the present invention is from 0.5 to 7 mass %, preferably from 0.8 to 6 mass %, and more preferably from 1 to 5 mass % on the basis of DHA used in the polymerization reaction.

The purity of the unreacted DHA recovered by steam distillation in the present invention is ordinarily from 90 to 99.9 mass %, preferably from 95 to 99.9 mass %, and more preferably from 97 to 99.9 mass %.

3. Purification of Unreacted DHA

The unreacted DHA obtained by steam distillation from the water-containing liquid mixture described above can be reused as part or all of the DHA serving as a polymerization raw material in the PAS polymerization step. The DHA may also be distilled and purified in the recovery step, and the recovery step of the PAS production method of the present invention preferably further includes the purification of unreacted DHA after steam distillation.

That is, the recovery step of the PAS production method of the present invention is preferably a recovery step of recovering unreacted DHA from a water-containing liquid mixture containing the separated liquid or a water-containing liquid mixture containing the separated liquid and the washing discharge liquid recovered in the washing step by steam distillation entailing adjusting the reflux ratio of water in the steam distillation column without adding water other than refluxed water, and further purifying the unreacted DHA.

Purification is a step of distilling the unreacted DHA. When the amount of one cycle of processing is small, the unreacted DHA recovered by steam distillation is collected and typically subjected to batch processing.

In this case, distillation purification is performed with a purification distillation column. High-purity unreacted DHA is obtained from the top of the purification distillation column, and impurities with a high boiling point are separated from the base of the purification distillation column. This purification may be performed any number of times.

When pDCB is used as DHA, the unreacted pDCB recovered from steam distillation is guided into the purification distillation column, and the top of the column is set to from 170 to 180° C. and preferably from 174 to 177° C. Ordinarily, the device is operated by applying a reflux with at least a certain reflux ratio, and the distillate is recovered once the prescribed temperature range is reached.

The purity of the unreacted DHA that is distilled and purified in this way is ordinarily from 97.5 to 99.99 mass %, preferably from 98.5 to 99.99 mass %, more preferably from 99.0 to 99.99 mass %, and particularly preferably from 99.3 to 99.99 mass %.

In order to stably produce PAS, the purity of the unreacted DHA to be reused needs to be not less than 99.5 mass % and preferably not less than 99.7 mass %. Note that DHA with a purity of 100 mass % is theoretically possible for the unreacted DHA that is distilled and purified, but the productivity decreases proportionally, and the yield of unreacted DHA becomes small.

4. Organic Amide Solvent

The organic amide solvent recovered as a column base fraction of the steam distillation column may also be reused directly, but in most cases, the organic amide solvent is purified by a polymerization solvent purification distillation column.

When NMP is used as an organic amide solvent, the organic amide solvent is often purified by separating impurities having a high boiling point using the polymerization solvent purification distillation column. The purified NMP is reused as a polymerization solvent.

5. Unreacted DHA Reusing Step

The PAS production method of the present invention preferably further includes a reusing step of reusing the unreacted DHA recovered in the recovery step (e) as part or all of the DHA in the polymerization step after the recovery step.

Although the recovered unreacted DHA may be used directly in the polymerization of PAS, the unreacted DHA is ordinarily used in the polymerization of PAS after being mixed with the DHA in the raw material tank.

Unreacted DHA may also be mixed with commercially available DHA and used. The mixing ratio of commercially available DHA and the recovered unreacted DHA can be set to an appropriate mixing ratio in accordance with the intended purpose of the PAS as a product. When the unreacted DHA that is recovered by the present invention is reused as all of the DHA in the polymerization step, the phenol concentration in the product slurry solution serving as a polymerization reaction solution after the polymerization step is ordinarily within the range of 500 to 3,500 ppm, preferably from 500 to 3,000 ppm, and particularly preferably from 500 to 2,600 ppm.

When the phenol concentration is within this range, it is possible to repeatedly reuse recovered unreacted DHA as the DHA in the polymerization step by means of a polymerization step, a separation step, and a recovery step for reusing the recovered unreacted DHA as the DHA in the polymerization step, a polymerization step, a separation step, and a recovery step for reusing the unreacted DHA recovered in this recovery step as the DHA in the polymerization step, and then a polymerization step, a separation step, and a recovery step for reusing the unreacted DHA recovered in this recovery step as the DHA in the polymerization step.

When the recovered unreacted DHA is used, it is ordinarily appropriate for the unreacted DHA to be used in an amount from 0.1 to 100 mass %, preferably from 0.5 to 50 mass %, and more preferably from 1 to 30 mass % on the basis of the total amount of DHA. In particular, when the purity of the unreacted DHA is less than 99.5 mass %, the amount is from 0.1 to 40 mass %, preferably from 0.1 to 20 mass %, and particularly preferably from 0.1 to 10 mass %. This is because when unreacted DHA having a lower degree of purification is used, the purity is preferably lower in order to stably control the melt viscosity.

PAS obtained by reusing part or all of the unreacted DHA recovered in the present invention has an average particle size and melt viscosity equivalent to those of PAS recovered as a product as described above, and equivalent thermal stability can also be achieved, which makes it possible to sufficiently withstand practical use.

EXAMPLES

The present invention will be described in further detail hereinafter using examples and production examples, but the present invention is not limited to these examples.

1. Measurement of Melt Viscosity

The melt viscosity was measured with a Capirograph 1-C manufactured by Toyo Seiki Seisaku-sho, Ltd. using approximately 20 g of a dried polymer. A flat die having 1 mm φ in diameter and 10 mm in length was used as a capillary. The preset temperature was set to 310° C. A polymer sample was introduced into the device, and after the sample was held there for 5 minutes at 310° C., the melt viscosity was measured at a shear rate of 1,216 $sec^{-1}$.

2. Thermal Stability

Using a Capirograph 1-C manufactured by Toyo Seiki Seisaku-sho, Ltd., the melt viscosity after a heat retention time of 5 minutes, 15 minutes, and 30 minutes was measured at a measurement temperature of 310° C. (shear rate: 1,216 $sec^{-1}$), and the thermal stability was evaluated by the retention rate of the melt viscosity after a heat retention time of 15 minutes and 30 minutes on the basis of the measurement taken after a heat retention time of 5 minutes.

The thermal stability was evaluated to be good when the retention rate was not less than 95%.

3. Measurement of Purity

The purity of DHA was measured by gas chromatography.

4. Analysis of Slurry Solution

A portion of the slurry solution after polymerization was batched off, and after an internal standard was added, the phenol concentration (amount) in the slurry solution was measured by FID-GC.

Production Example 1 (Preparation of PAS)

Dehydration Step

A dehydration step was performed by charging 600 kg of NMP, 185 kg of sodium hydrosulfide having a concentration of 62.4 mass % (2,042 mol in terms of NaSH), and 110 kg (2,158 mol) of sodium hydroxide having a concentration of 73.6 mass % into a reaction vessel and heating until the temperature inside the reaction vessel reached 200° C. The amount of hydrogen sulfide volatilized in this dehydration step was 0.57 kg (17 mol). When the amount of the sulfur source inside the reaction vessel (charged sulfur source) was calculated using this value, the amount was 2,025 mol.

Polymerization Step

First, 303.6 kg (2,065 mol) of commercially available pDCB was charged into the reaction vessel as a raw material for PAS production (pDCB/sulfur source (molar ratio)=1.02), and after the composition was heated to 220° C. and reacted for 1 hour, the composition was further heated to 230° C. and further reacted for 1.5 hours. Next, 14.6 kg of water was fed into the reaction vessel, and the composition was heated to 260° C. and reacted for 5 hours (pDCB conversion ratio: 98%). After polymerization was complete, the reaction vessel was cooled to around room temperature to obtain a reaction solution containing a light green reaction product in a slurry. The phenol content in this slurry solution was 1,430 ppm.

Separation Step

The reaction solution was sieved with a screen having an aperture of 150 μm (100 mesh) and separated into a wet cake containing PAS on the screen and a component that passed through the screen. This separated liquid was stored in a separated liquid tank.

Washing Step

After the wet cake was brought into contact with acetone in an amount five times the mass of the wet cake while stirring for ten minutes at room temperature, the resultant was sieved with a screen having an aperture of 150 μm and separated into a polymer component remaining on the screen and a component that passed through the screen. The washing operation described above was performed once again on the polymer component remaining on the screen. The entire amount of the washing discharge liquid that passed through the screen was recovered and stored in a washing discharge liquid tank for use in the recovery of pDCB. The PAS remaining on the screen was brought into contact with ion-exchanged water in an amount five times the mass of the PAS while stirring for ten minutes at room temperature, and after the resultant was then sieved with a screen having an aperture of 150 μm, the PAS remaining on the screen was once again recovered. This operation was repeated two more times. The washing discharge liquid originating from water passing through the screen was stored in the washing discharge liquid tank.

The composition was then brought into contact with ion-exchanged water or the like at room temperature as necessary, and PAS was recovered. This operation was performed several times, and the PAS remaining on the screen was recovered and dried at 105° C. This washing discharge liquid was also stored in the washing discharge liquid tank.

The purity of the pDCB and the melt viscosity of the PAS that were used are shown in Table 1.

Example 1

A solution prepared by mixing the separated liquid stored in the separated liquid tank in the separation step and the washing discharge liquid stored in the washing discharge liquid tank in the washing step in Production Example 1 was used as a water-containing liquid mixture. By distilling the water-containing liquid mixture using a distillation column for recovering an organic solvent, the acetone of the column top fraction was recovered, and the water-containing liquid mixture at the base of the column was used in the recovery step.

Unreacted pDCB Recovery Step

A steam distillation column with a stationary reflux device was used, and the temperature of the base of the column was set to 210° C., while the temperature at the top of the column was set to 100° C. The column top fraction (distillate) was recovered from the top of the column by steam distillation. The column top fraction was guided into a stationary reflux device having a partition plate. Water and pDCB were separated using the difference in liquid specific gravity, and the separated water was refluxed in accordance with the reflux ratio. The reflux ratio was 0.5.

It was confirmed that the pDCB was recovered by visual observation from the inspection window of the stationary reflux device.

The purity of the pDCB recovered by steam distillation was 98.0 mass %.

The recovery rate of the recovered pDCB was 2 mass % on the basis of the pDCB used in Production Example 1.

Unreacted pDCB Reusing Step

PAS was produced in the same manner as in the PAS production method of Production Example 1 with the exception that all of the pDCB recovered by steam distillation was used instead of the pDCB used in Production Example 1 and that the polymerization reaction scale was set to 1/200. The phenol content in the obtained slurry solution was 2,550 ppm.

The melt viscosity of the PAS produced using the recovered pDCB was 30 Pa·s. In addition, the thermal stability at the time of molding was equivalent to that of Production Example 1.

The purity of the recovered unreacted pDCB and the melt viscosity of the PAS are shown in Table 1.

Example 2

Unreacted pDCB Recovery Step

In this example, pDCB was recovered in the same manner as in Example 1 with the exception that the reflux ratio was set to 1.5.

The purity of the pDCB recovered by steam distillation was 98.5 mass %.

The recovery rate of the recovered pDCB was 2 mass % on the basis of the pDCB used in Production Example 1.

Unreacted pDCB Reusing Step

PAS was produced in the same manner as in the PAS production method of Example 1 with the exception that all of the pDCB recovered by steam distillation was used. The phenol content in the obtained slurry solution was 2,000 ppm.

The melt viscosity of the PAS produced using the recovered pDCB was 45 Pa·s. In addition, the thermal stability at the time of molding was equivalent to that of Production Example 1.

The purity of the recovered unreacted pDCB and the melt viscosity of the PAS are shown in Table 1.

Example 3

Unreacted pDCB Recovery Step

In this example, pDCB was recovered in the same manner as in Example 1 with the exception that the reflux ratio was set to 5.0.

The purity of the pDCB recovered by steam distillation was 99.01 mass %.

The recovery rate of the recovered pDCB was 2 mass % on the basis of the pDCB used in Production Example 1.

Unreacted pDCB Reusing Step

PAS was produced in the same manner as in Example 1 with the exception that all of the pDCB recovered by steam distillation was used. The phenol content in the obtained slurry solution was 1,500 ppm.

The melt viscosity of the PAS produced using the recovered pDCB was 95 Pa·s. In addition, the thermal stability at the time of molding was equivalent to that of Production Example 1. The purity of the recovered unreacted pDCB and the melt viscosity of the PAS are shown in Table 1.

Example 4

Purification of Unreacted pDCB

In this example, pDCB recovered in the same manner as in Example 1 was distilled by purification distillation. A composition having a boiling point from 174° C. to 178° C. was collected from the top of the column and recovered as pDCB. The purity of pDCB purified in this way was 99.8 mass %.

The recovery rate of this pDCB was 1.8 mass % on the basis of the pDCB used in Production Example 1.

Unreacted pDCB Reusing Step

PAS was produced in the same manner as in Example 1 with the exception that all of the distilled and purified pDCB was used. The phenol content in the obtained slurry solution was 2,150 ppm. The melt viscosity of the PAS produced using the recovered pDCB was 217 Pa·s. In addition, the thermal stability at the time of molding was equivalent to that of Production Example 1. The purity of the unreacted pDCB and the melt viscosity of the PAS are shown in Table 1.

Example 5

Purification of Unreacted pDCB

In this example, pDCB recovered in the same manner as in Example 2 was distilled with a purification distillation column. The purity of the pDCB that was distilled and purified in this way was 99.93 mass %.

The recovery rate of this pDCB was 1.7 mass % on the basis of the pDCB used in Production Example 1.

Reuse of Unreacted pDCB

PAS was produced in the same manner as in the PAS production method of Example 1 with the exception that all of the distilled and purified pDCB was used. The phenol content in the obtained slurry solution was 1,760 ppm.

The melt viscosity of the PAS produced using the recovered pDCB was 260 Pa·s. In addition, the thermal stability at the time of molding was equivalent to that of Production Example 1.

The purity of the unreacted pDCB and the melt viscosity of the PAS are shown in Table 1.

Note that in Examples 1 to 5, the charged amount of pDCB is an amount calculated while taking purity into concentration.

TABLE 1

| | Example 1 | Example 2 | Example 3 | Example 4 | Example 5 | Production Example 1 |
|---|---|---|---|---|---|---|
| pDCB | (Steam distillation) Recovered pDCB | (Steam distillation) Recovered pDCB | (Steam distillation) Recovered pDCB | (Steam distillation, distillation purification) Recovered pDCB | (Steam distillation, distillation purification) Recovered pDCB | Pure pDCB (Remarks) |
| Purity | 98.0 Mass % | 98.5 Mass % | 99.01 Mass % | 99.8 Mass % | 99.93 Mass % | 100 Mass % |
| Melt viscosity | 30 Pa · s | 45 Pa · s | 95 Pa · s | 217 Pa · s | 260 Pa · s | 271 Pa · s |

Observations:

As is clear from the results shown in Table 1, the PAS of Examples 1 to 3, in which unreacted pDCB recovered by the steam distillation of the present invention was used, demonstrated a melt viscosity that was lower than that of the PAS of Production Example 1 but was within the target numerical range. The PAS of Examples 1 to 3 was also comparable to the PAS of Production Example 1 from the perspective of thermal stability.

Based on this result, it can be seen that the PAS can be sufficiently used industrially by blending pure pDCB and recovered unreacted pDCB in accordance with the melt viscosity of the target PAS.

The PAS of Examples 4 and 5, in which the unreacted pDCB of the present invention was used, demonstrated melt viscosities of the same level and was comparable to the PAS of Production Example 1 from the perspective of thermal stability.

Based on this result, it can be seen that even when the pDCB recovered in Examples 4 and 5 is used directly without being blended, a PAS having the target melt viscosity can be sufficiently produced industrially.

INDUSTRIAL APPLICABILITY

With the present invention, high-purity unreacted DHA was recovered by performing steam distillation entailing adjusting the reflux ratio of water on a water-containing liquid mixture containing a separated liquid separated from PAS by solid-liquid separation from a polymerization reaction solution after the polymerization of PAS without adjusting the amount of water by newly adding water other than the refluxed water and without introducing steam also serving as a heat source (in other words, without adding water).

At the same time, it was possible to stably produce PAS even by reusing the recovered unreacted DHA. Furthermore, by incorporating this into a stationary reflux device, it became possible to easily separate unreacted DHA and water based on the difference in liquid specific gravity thereof.

In addition, with the present invention, high-purity unreacted DHA was recovered by performing steam distillation entailing adjusting the reflux ratio of water on a water-containing liquid mixture and/or a water-containing steam mixture discharged from the dehydration step performed during the PAS polymerization reaction without adjusting the amount of water by newly adding water other than the refluxed water and without introducing steam also serving as a heat source (in other words, without adding water).

At the same time, it was possible to stably produce PAS even by reusing the recovered unreacted DHA. Furthermore, by incorporating this into a stationary reflux device, it became possible to easily separate unreacted DHA and water based on the difference in liquid specific gravity thereof.

As a result, reusing the recovered unreacted DHA makes it possible to reduce the production cost, which enhances the competitive power of PAS as a plastic. It also becomes possible to reduce waste, which contributes to a solution to resource and environmental problems. Furthermore, a shaped product obtained using the PAS produced stably by the production method of the present invention can be used in a wide range of technical fields such as electrical and electronic part materials, automobile equipment part materials, chemical equipment part materials, and water section part materials.

REFERENCE SIGNS LIST

1 Steam distillation column
2 Stationary reflux device
3 Inspection window
4 Partition plate
5 Siphon tube
A Water-containing liquid mixture
B Column top fraction
C Column base fraction
D Water
E Water
F Unreacted DHA

The invention claimed is:

1. A production method for producing polyarylene sulfide, the method comprising:

(a) a polymerization step of producing a polymerization reaction solution containing polyarylene sulfide by performing a polymerization reaction on at least one type of sulfur source selected from the group consisting of alkali metal sulfides and alkali metal hydrosulfides and a dihalo aromatic compound in an organic amide solvent;

(b) a separation step of separating the polymerization reaction solution obtained in the polymerization step into polyarylene sulfide and a separated liquid by solid-liquid separation;

(c) a recovery step of recovering an unreacted dihalo aromatic compound from a water-containing mixture in the form of a water-containing liquid mixture containing the separated liquid by steam distillation entailing using a steam distillation column having a static reflux device and adjusting a reflux ratio of water by refluxing water in the vicinity of a top of the steam distillation column; and (e) a reusing step of reusing the unreacted dihalo aromatic compound recovered in the recovery step (c) as part or all of the dihalo aromatic compound in the polymerization step after the recovery step (c), wherein, in the recovery step (c), a liquid-liquid two-phase state of the unreacted dihalo aromatic compound and water containing impurities in a soluble state is achieved by condensing a column top fraction of the steam distillation column, a condensate of the top fraction of the steam distillation column is guided into the stationary reflux device, the condensate is separated into the unreacted dihalo aromatic compound and the water by liquid-liquid separation at a temperature higher than a melting point of the unreacted dihalo aromatic compound in the stationary reflux device, a part of the water separated in the stationary reflux device is refluxed to the steam distillation column in the vicinity of the top of the steam distillation column, the unreacted dihalo aromatic compound is not refluxed to the steam distillation column, and the unreacted dihalo aromatic compound having purity of 90 to 99.9 mass % is recovered by liquid-liquid separation of a condensate of the top fraction of the steam distillation column in the liquid-liquid two-phase state.

2. A production method for producing polyarylene sulfide, the method comprising:

(a) a polymerization step of producing a polymerization reaction solution containing polyarylene sulfide by performing a polymerization reaction on a raw material mixture containing at least one type of sulfur source selected from the group consisting of alkali metal sulfides and alkali metal hydrosulfides and a dihalo aromatic compound in an organic amide solvent;

(d) a dehydration step of removing water content by steam distillation from a water-containing mixture in the form of a water-containing liquid mixture and/or a water-containing steam mixture containing the raw material mixture and/or a polymerization reaction solution during the polymerization reaction;

(c) a recovery step of recovering an unreacted dihalo aromatic compound from the water-containing mixture by steam distillation entailing using a steam distillation column having a stationary reflux device and adjusting a reflux ratio of water by refluxing water in the vicinity of a top of the steam distillation column in the dehydration step; and (e) a reusing step of reusing the unreacted dihalo aromatic compound recovered in the recovery step (c) as part or all of the dihalo aromatic compound in the polymerization step after the recovery step (c), wherein, in the recovery step (c), a liquid-liquid two-phase state of the unreacted dihalo aromatic compound and water containing impurities in a soluble state is achieved by condensing a column top fraction of the steam distillation column, a condensate of the top fraction of the steam distillation column is guided into the stationary reflux device, the condensate is separated into the unreacted dihalo aromatic compound and the water by liquid-liquid separation at a temperature higher than a melting point of the unreacted dihalo aromatic compound in the stationary reflux device, a part of the water separated in the stationary reflux device is refluxed to the steam distillation column in the vicinity of the top of the steam distillation column, the unreacted dihalo aromatic compound is not refluxed to the steam distillation column, and the unreacted dihalo aromatic compound having purity of 90 to 99.9 mass % is recovered by liquid-liquid separation of a condensate of the top fraction of the steam distillation column in the liquid-liquid two-phase state.

3. The production method according to claim 1, wherein the recovery step (c) is a recovery step of separating water containing an unreacted dihalo aromatic compound and an organic amide solvent from the water-containing mixture by steam distillation entailing using a steam distillation column having a static reflux device and adjusting a reflux ratio of water by refluxing the water-containing liquid mixture in the vicinity of a top of the steam distillation column, and recovering the unreacted dihalo aromatic compound from the water containing the unreacted dihalo aromatic compound.

4. The production method according to claim 1, wherein a reflux ratio of water is from 0.1 to 30, the reflux ratio of water being calculated using water discharged without being refluxed as a denominator and using refluxed water as a numerator out of the water in the distillate from the top of the steam distillation column.

5. The production method according to claim 1, further comprising (b') a washing step of washing the polyarylene sulfide separated in the separation step between the separation step (b) and the recovery step (c), wherein the water-containing mixture in the recovery step (c) at this time is a water-containing liquid mixture containing the separated liquid and a washing discharge liquid recovered in the washing step.

6. The production method according to claim 1, wherein, in the recovery step (c), the unreacted dihalo aromatic compound having purity of 98 to 99.1 mass % is recovered by liquid-liquid separation of the condensate of the top fraction of the steam distillation in the liquid-liquid two-phase state.

* * * * *